United States Patent [19]

Baertlein

[11] Patent Number: 5,152,713
[45] Date of Patent: Oct. 6, 1992

[54] UNIVERSAL POWER HEAD FOR HAND OPERATED TOOLS

[75] Inventor: Lee A. Baertlein, Cedarburg, Wis.

[73] Assignee: Vac-Air, Inc., Milwaukee, Wis.

[21] Appl. No.: 755,620

[22] Filed: Sep. 5, 1991

[51] Int. Cl.[5] ................................................. A22B 3/08
[52] U.S. Cl. ........................................ 452/64; 30/187;
30/228
[58] Field of Search ............... 452/64, 63, 52; 30/187,
30/90, 245, 246, 228, 260

[56] References Cited

U.S. PATENT DOCUMENTS

| | | | |
|---|---|---|---|
| 2,488,224 | 11/1949 | Mothorn | 30/228 |
| 2,733,506 | 2/1956 | Wild | 30/228 |
| 3,330,037 | 7/1967 | Hoen et al. | 30/187 |
| 3,816,874 | 6/1974 | Jahnke | 452/167 |
| 3,893,237 | 7/1975 | Jahnke | 30/187 |
| 4,109,381 | 8/1978 | Pellenc | 30/228 |
| 4,949,461 | 8/1990 | Van der Merwe et al. | 30/245 |

Primary Examiner—Willis Little
Attorney, Agent, or Firm—Foley & Lardner

[57] ABSTRACT

A universal head for actuating one of a number of cutting and trimming assemblies, the head including a handle, a double acting piston and cylinder assembly secured to the handle, a blind bore in each end of the piston and cylinder assembly, each blind bore being connected to the cylinder assembly, an air inlet passage and an air discharge passage connected to each end of each of the bores, a pressure responsive valve member in each bore, a spring mounted in each bore for biasing the valve members to a closed position with respect to each of the air inlet passages, the valve members being responsive to air pressure in the inlet air passage to direct air into the cylinder assembly and a trigger operated air valve member mounted on the housing for selectively connecting the source of air pressure to one or the other of the air inlet passages.

7 Claims, 4 Drawing Sheets

UNIVERSAL POWER HEAD FOR HAND OPERATED TOOLS

FIELD OF THE INVENTION

The present invention relates to a universal power head which can be used with a number of poultry and livestock cutting and trimming devices and more particularly to a universal power head which operates under power in both directions of motion.

BACKGROUND OF THE INVENTION

In the preparation of poultry and livestock for market, it is passed through a number of cutting and trimming stations or steps which include neck breaking, cutting and trimming various parts of the poultry and livestock. Each of these functions requires a different type of utensil in order to perform the required function. At the present time various types of tools are used such as shown in U.S. Pat. No. 3,816,874, entitled "Poultry Cutter," issued on Jun. 18, 1974. Each of the different types of tools operates in different directions of motion. In some instances power is required in one direction of motion while in other instances power is required in the other direction of motion and in some instances power may be required in both directions of motion. Different types of heads are generally provided for each of these requirements.

SUMMARY OF THE PRESENT INVENTION

The universal power head, according to the present invention, includes a housing having a double-acting piston and cylinder assembly mounted in the housing. The housing is provided with a pair of support arms which support cutting, breaking or trimming blades. The trigger control unit for operating the piston and cylinder assembly may be mounted in either the handle or housing. The head can be power operated in both directions of motion depending on the machining of the air passage ways.

Air discharge is advantageously confined to a discharge passage in the housing for ease of operations. A muffler may be provided in the exhaust passage.

Other principal features and advantages of the invention will become apparent to those skilled in the art upon review of the following drawings, the detailed description and the appended claims.

BRIEF DESCRIPTION OF THE DRAWINGS

FIG. 1A is a schematic view of the two positions of a set of cutter blades.

Figure 1:
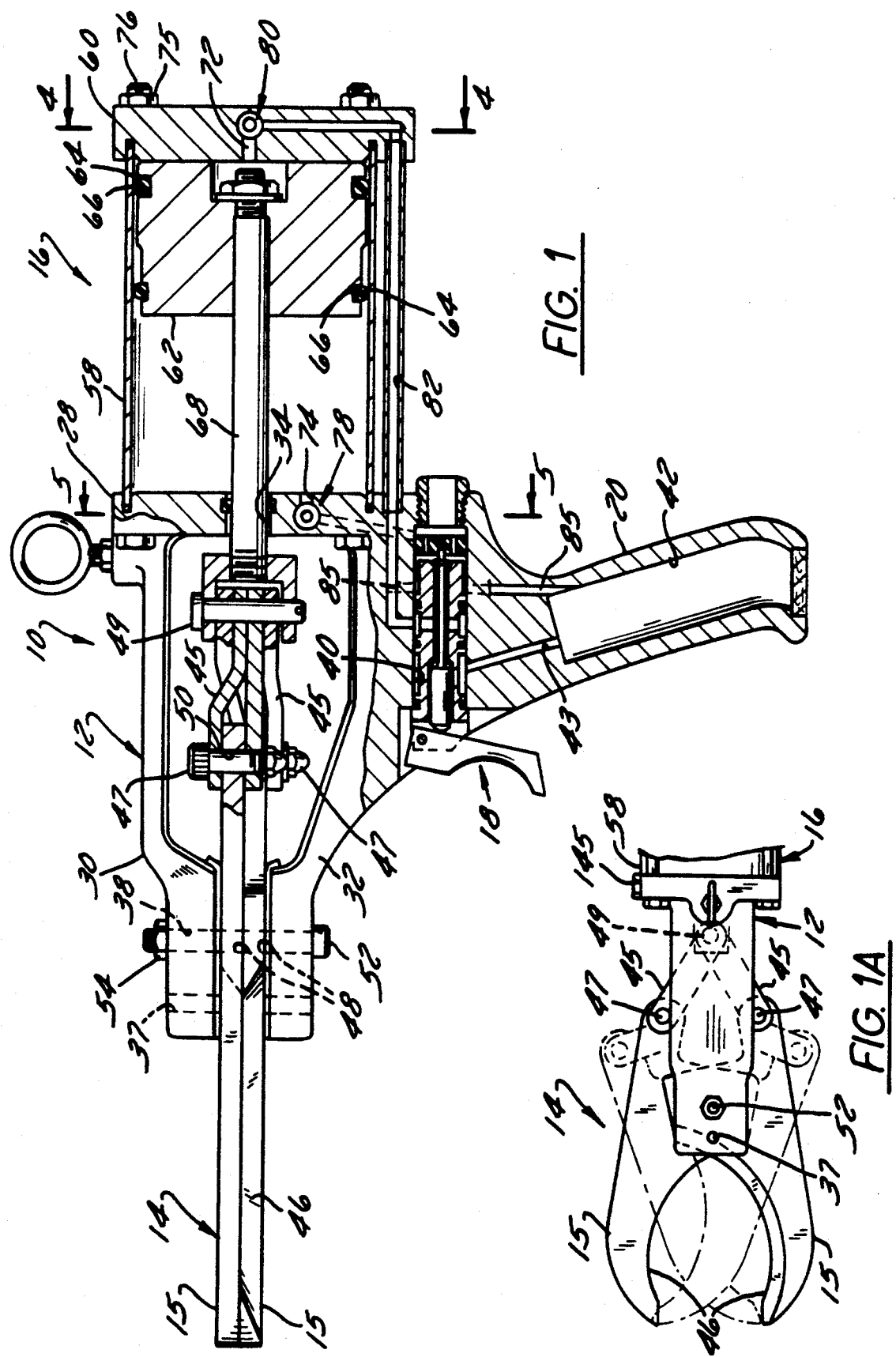
FIG. 1 is a side view in section of the universal head showing the piston in the return or rearward position.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purposes of description and should not be regarded as limiting.

DETAILED DESCRIPTION OF THE PREFERRED EMBODIMENTS

The universal head 10 as shown in FIG. 1 of the present invention generally includes a housing or body 12 having a handle 20. A blade assembly 14 is mounted on the housing and actuated by means of a pneumatic piston and cylinder assembly 16. The piston and cylinder assembly 16 is actuated by means of a trigger actuated valve assembly 18 provided in the handle 20. Actuation of the valve assembly 18 is accomplished by gripping the handle 20 and squeezing the trigger assembly 18. Actuation of the trigger assembly pressurizes one end of the piston and cylinder assembly 16 to close the blade assembly 14 on the forward stroke of the piston and cylinder assembly. On release of the trigger assembly 18, the other end of the piston and cylinder assembly 16 is pressurized to close or open the blade assembly 18 on the return stroke.

More particularly, and referring to FIG. 1, the housing 12 is shown in the form of a casting having an end plate 28, upper and lower support arms 30 and 32, and the handle 20. End plate 28 includes a central aperture 34 and a number of mounting holes 36. A pair of holes 37 and 38 are provided in the end of each of the upper and lower arms 30 and 32. A bore 40 is provided in the handle 20 which is connected to an exhaust passage 42 in the handle 20 by passage 43.

Piston And Cylinder Assembly

The piston and cylinder assembly 16 includes a cylindrical housing 58 having one end seated on the end plate 28 of the body 12. An end plate 60 having mounting holes 63 is seated in the open end of the cylindrical housing 58. The end plate 28, cylinder housing 58 and end cap 60 are held in a fixed relation by means of a number of screws 76 which extend through holes 36 in end plate 28 and holes 63 in end plate 60. Nuts 75 are mounted on the ends of the screws 76.

A piston head 62 is mounted in the cylindrical housing 58 and sealed therein by means of cup seals 64 provided in grooves 66 in the outer surfaces of the piston head 62. A piston rod 68 is connected to the piston head 62 and extends outwardly through the opening 34 in the end cap 28.

Air is admitted to the cylinder housing 58 through a port 72 in end cap 60 and a port 74 in end plate 28. Air is exhausted from cylinder housing 58 through a port 84 in end cap 60 and a port 86 in end plate 28. The flow of air into and out of the cylinder housing 58 is controlled by means of pressure actuated air valve assembly 78 in plate 28 and pressure actuated air valve assembly 80 in cap 60.

Air Valve Assemblies

Means are provided for controlling the admission of air into and out of the cylinder 58. Such means is in the form of the air valve assemblies 78 and 80 which are mounted in blind bores 140 and 142, respectively, provided in end plate 28 and end cap 60. In this regard, each air valve assembly 78 and 80 includes a valve element 141 and a spring 143 provided in each of the bores 140 and 142. The springs are retained therein by caps 145 and 147, respectively. The bore 140 intersects the ports 74 and 84 in end plate 28. The bore 142 intersects the ports 72 and 84 in end cap 60. The valve elements 141 are normally biased into the end of the bores 140 and 142 to connect the exhaust ports 86 and 84, respectively, to the corresponding exhaust passages 83 and 85. When air under pressure is admitted into the bore 140 or 142, the valve elements 141 will compress the spring 143 to admit air into ports 74 or 72, respectively.

Figure 4A:
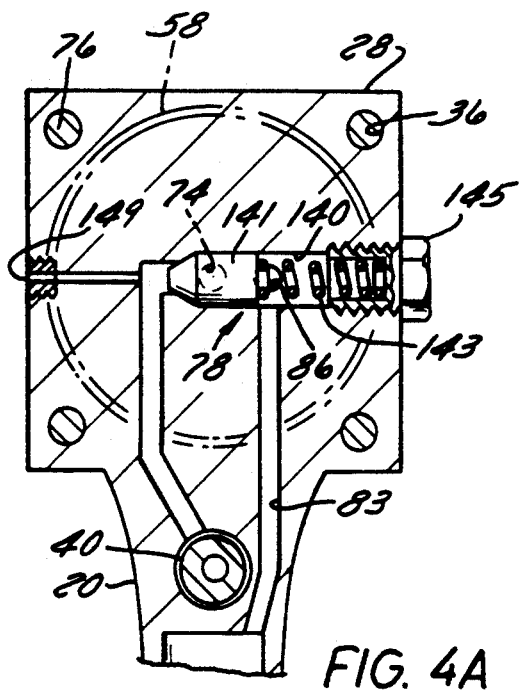
FIG. 4A is a view similar to FIG. 4 showing the rearward pressure control valve assembly in the pressure position.
Figure 4:
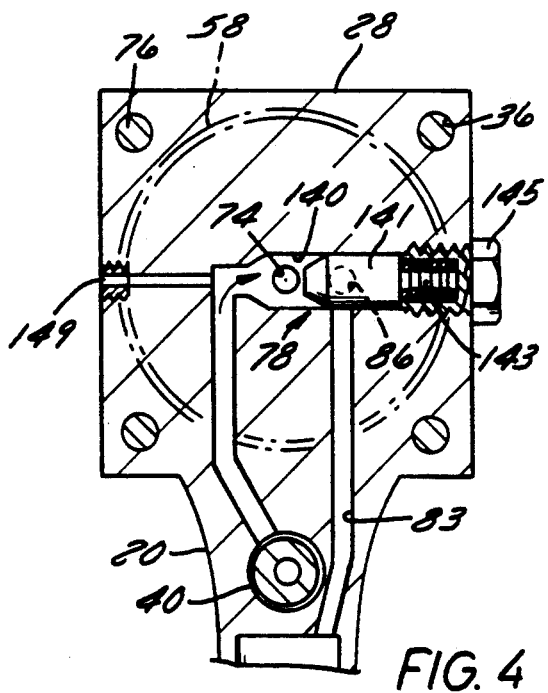
FIG. 4 is a view taken on line 4—4 of FIG. 1 showing the rearward pressure control valve assembly with the piston in the return or retracted position.
Figure 5A:
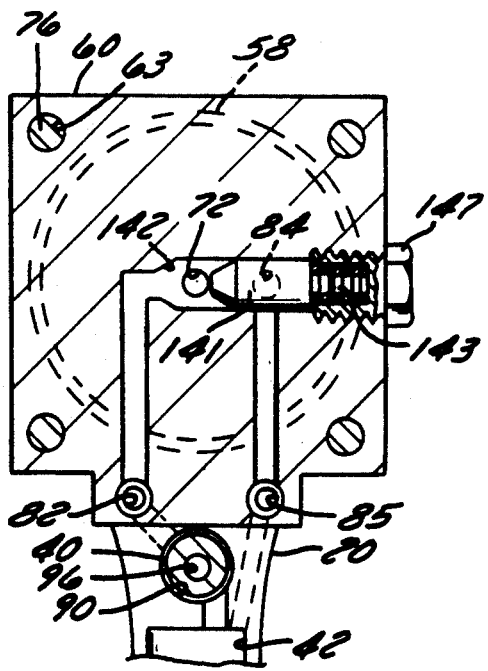
FIG. 5A is a view similar to FIG. 5 showing the front pressure control valve in the exhaust position.
Figure 5:
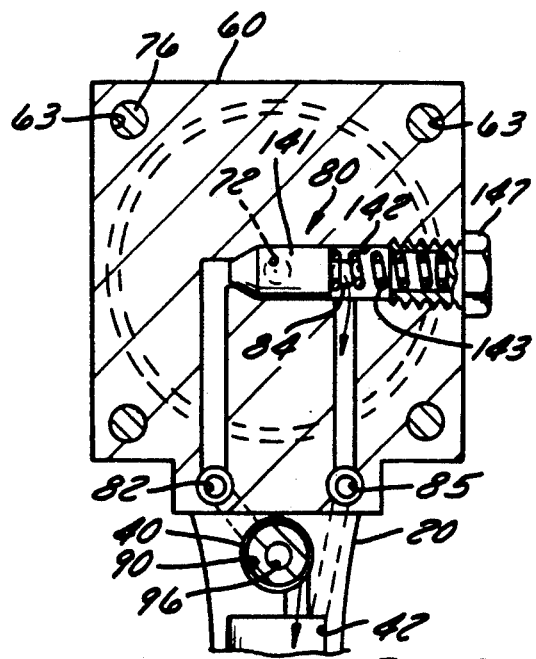
FIG. 5 is a view taken on line 5—5 of FIG. 1 showing the front pressure control valve assembly in the pressure position.

When air under pressure enters the cylinder housing 58 through port 72, FIG. 4A, the force of the air acting on the piston head 62 will move the piston 62 forward to actuate the blade assembly 14. Air on the other side of the piston head 62 will be discharged through port 86, FIG. 5A, into bore 140. Return motion of the piston head 62 to the position shown in FIG. 1 is achieved by increasing the pressure in bore 140, FIG. 5. Air on the other side of the piston head 62 will be exhausted through port 84 into bore 142, FIG. 4. An air bleed passage 149 is provided in one of the end caps 28 to relieve the pressure in the bore 140 on the forward stroke of the piston 62.

Trigger Actuated Valve Assembly

Figure 2:
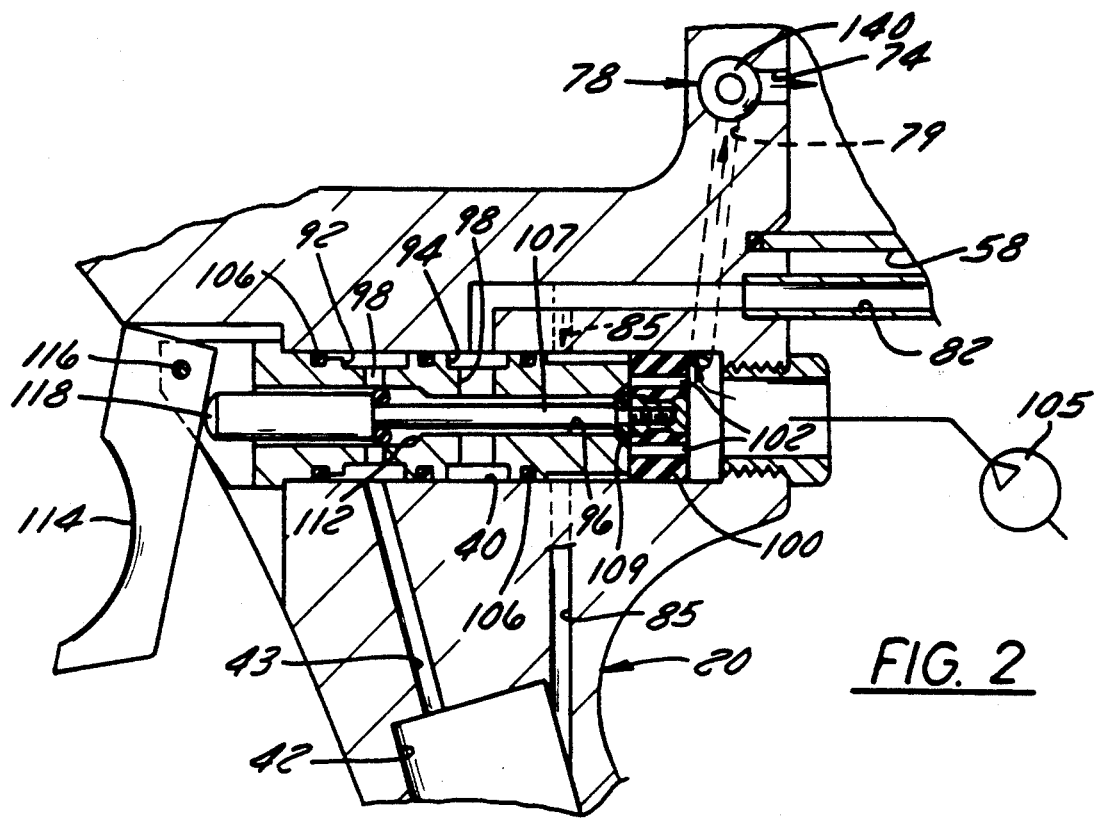
FIG. 2 is a cross-section view of the trigger operated valve assembly shown in the trigger release position.
Figure 3:
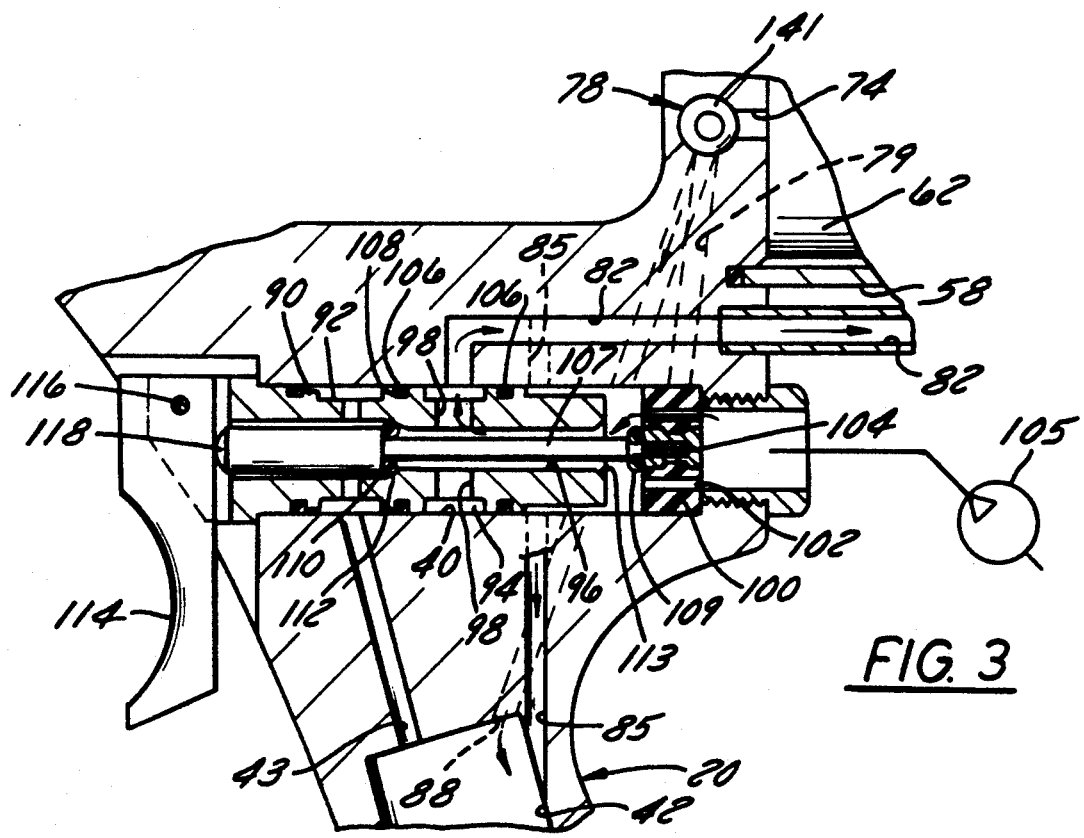
FIG. 3 is a view similar to FIG. 2 with trigger operated valve assembly shown in the trigger actuated position.

Means are provided for controlling the admission of air under pressure to the air valve assemblies 78 and 80. Such means is in the form of the trigger actuated valve assembly 18. In this regard, the valve assembly 18 is positioned in the bore 40 in the handle 20. The bore 40 as seen in FIGS. 2 and 3 is connected to the bore 142 in the end cap 60 at the back of the cylindrical housing 58 by an inlet passage 82. Air is exhausted from bore 142 through an exhaust passage 85 connected to bore 42 in the handle. The bore 40 is connected by an inlet passage 79 to the bore 140 in end plate 28 at the other end of the cylindrical housing 58. Air is exhausted from bore 140 through an exhaust passage 88 which is connected to one end of bore 42 in the handle. The flow of air through the bore 40 to the inlet passages 82 and 79 is controlled by means of the trigger actuated valve assembly 18.

The trigger assembly 18 includes a tubular member 90 having recessed grooves 92 and 94 and a central passage 96. Central passage 96 is connected to the groove 94 by transfer passage 98. A valve stem 107 is positioned in the central passage 98 of member 90. A resilient air flow member 100 having air flow passages 102 is mounted on the valve stem 107. In this regard the member 100 includes a threaded support 101 having a rubber ring 103 formed around the periphery of the support 101. The member 101 is threaded onto the threaded end 104 of member 107. The grooves 92 and 94 are sealed in the bore 40 by means of O-ring seals 106 located in annular grooves 108 on each side of the grooves 92 and 94.

The flow of air through the passage 96 is controlled by means of the valve stem 107. An O-ring seal 109 is provided at one end of the valve stem to sealingly engage the inlet 113 of the passage 96. An O-ring 110 is provided at the other end of the valve stem to sealingly engage a shoulder 112 at the discharge end of the passage 96. The O-ring seals 109 and 110 are spaced a distance apart slightly greater than the length of passage 96. Air is supplied to the open end of bore 40 by a compressor 105.

Under normal operating conditions, the pressure of the air in bore 40 will act against the cross-sectional area of valve member 100 to force the valve stem 107 to a closed position with the valve member 100 sealingly engaging the end of the passage 96. Air under pressure will pass through passage 79 to bore 140 to open port 74. In the closed position the annular groove 92 will be connected to the groove 94 through ports 98, passage 96 and ports 95. The discharge groove 92 is vented to atmosphere through the passage 43 in the handle 20.

The valve stem 107 is moved axially in the passage 96 by means of a trigger 114 pivotally mounted on a pivot pin 116 anchored to the handle 20 and located at the end of the valve stem 107. The trigger 114 is positioned to engage the outwardly extending end 118 of the valve stem 107. Pivotal movement of the trigger 114 toward the valve stem will move the valve stem axially in the passage 96. The valve member 100 will be moved away from the inlet end of the passage 96 closing the passage 79 and allowing air under pressure to enter the passage 96 through opening 102. The 0-ring seal 110 will sealingly engage the shoulder 112 closing the end of the passage 96. Air entering the passage 96 will flow through the passage 98 into recess 94 and out through inlet passage 82 to bore 142 to pressurize the cylinder assembly. On release of the trigger 114, the air under pressure in bore 40 will move the valve stem 107 axially in the passage 96 to close the inlet to passage 96 and open the passage 79. Air under pressure will flow through inlet passage 79 into the other end of the cylinder assembly to return the piston head to the back end of the housing.

Cutting Blades

The cutting blade assembly as shown in FIGS. 1 and 1A includes a pair of identical blades 15 so that they can be interchangeably mounted on the housing 12. Each of the cutting blades 15 includes a radial cutting edge 46 and a hole 48. A second hole 50 is provided at the inner end of each of the cutting blades 15 at a spaced distance from the hole 48. The blades are mounted in the space between the ends of the upper and lower arms 30 and 32 with holes 48 axially aligned with the bores 38. The blades are mounted for pivotal movement on the body by means of a bolt 52 which extends through the holes 38 and 48 and is retained therein by locknut 54. The blades 15 are connected to the piston rod 68 by means of links 45. One end of each link is connected to the blades 15 by means of a pin 47. The other end of the links 45 are connected to the end of piston rod 68 by a pin 49. With this arrangement the cutting action occurs when the piston head 62 is moved forward.

Figure 6:
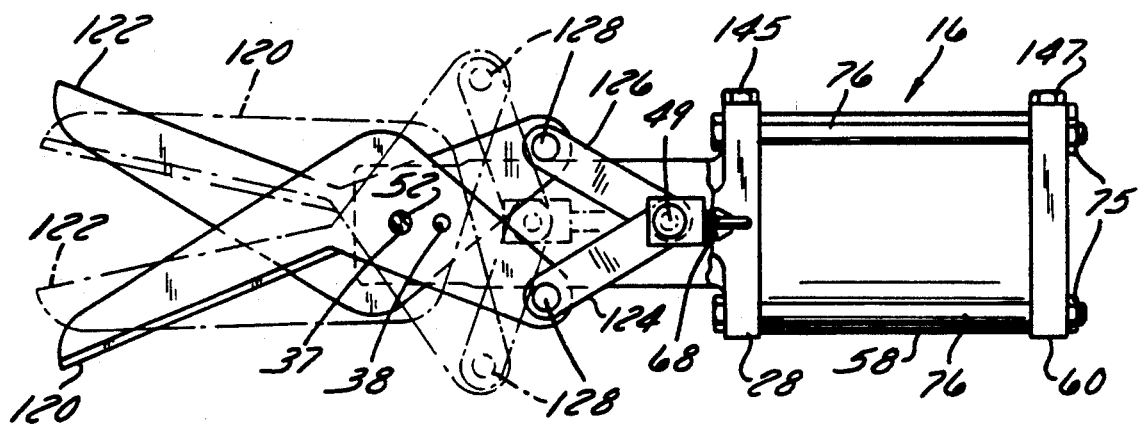
FIG. 6 is a view of the universal head shown connected to operate a pair of scissors.

When the universal head is used to operate as a scissor, a pair of blades 120, 122 as shown in FIG. 6 are mounted on a bolt 52 in holes 37 in the ends of upper and lower arms 30 and 32. Although the arms are shown in a horizontal position they could also be located in a vertical position. The blades 120, 122 are mounted for pivotal movement on the bolt 52 which is retained therein by locknuts 54 as described above. The blades 120, 122 are connected to the piston rod 68 by means of links 124 and 126 which are connected to the outer end of the blades by pins !28. When connected in this relationship the blades are closed on the forward stroke of the piston. The blades could also be connected to open on the forward stroke of the piston as desired.

Figure 7:
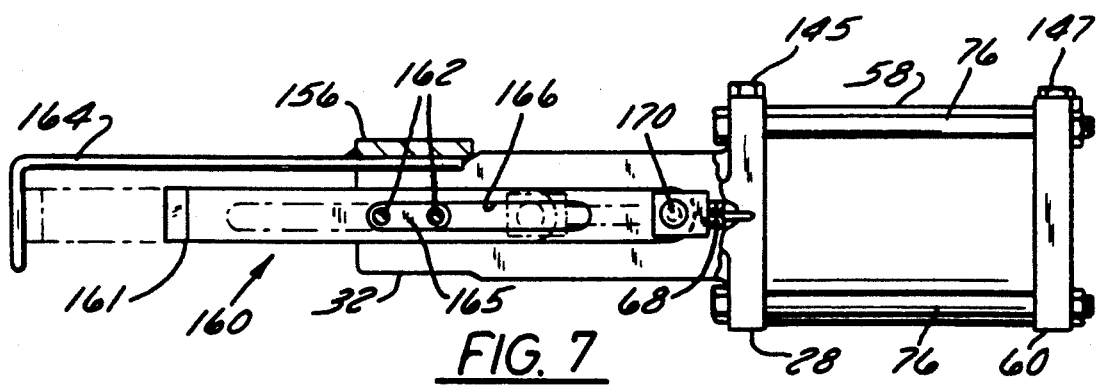
FIG. 7 is a top view of the universal head shown connected to a neck breaker assembly.
Figure 8:
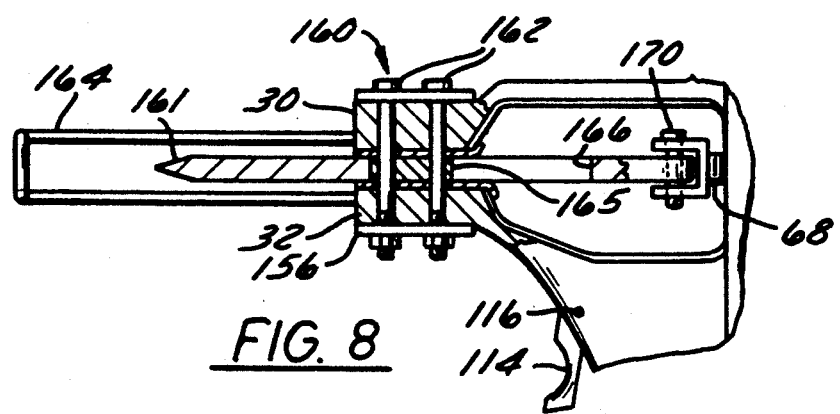
FIG. 8 is a side view partly in section of the neck breaker assembly.

The universal head can also be used to operate a neck breaker assembly 160, FIGS. 7 and 8, which is mounted on the upper and lower arms 30 and 32 by means of bolts 162. The neck breaker includes a formed wire stop 164 which is welded to a channel member 156 which is secured to the arms 30 and 32 by bolts 162. A pointed single blade 161 having a slot 166 is mounted in the arms 30 and 32 for movement with respect to a guide washer 165 mounted on the bolts 162. The end of the is connected to the piston by a bolt 170.

Thus, it should be apparent that there has been provided in accordance with the present invention a universal power head for hand operated tools that fully satisfies the aims and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A universal head for a cutter assembly, a scissor assembly or neck breaker assembly, said head comprising a handle, means on said handle for supporting one of the cutter, scissor, or breaker assemblies, a pneumatic piston and cylinder assembly mounted on said handle, a blind bore in each end of said cylinder assembly, each of said blind bores being connected by a passage to said cylinder, a pressure responsive valve member mounted in each bore, an air inlet passage and an air discharge passage connected to each end of each of said bores, a spring mounted in each bore for biasing said valve members to a closed position with respect to each of said air inlet passages, said valve members being responsive to air pressure in said inlet air passage to direct air into said cylinder assembly, and means mounted on said housing for selectively connecting said source of air pressure to one or the other of said inlet passages.

2. The head according to claim 1 wherein said connecting means comprises:
a trigger operated air valve member connected to control the pressure responsive valve member.

3. The head according to claim 2 wherein said trigger operated valve member includes:
a tubular member mounted in the handle,
said tubular member including a pair of grooves in the outer periphery and a central passage having a counterbore at one end, said central passage being connected to one of the grooves by a number of ports, and
a valve stem mounted in said passage and having a head at one end positioned in said counterbore, and means at the other end of said valve stem for connecting one or the other of the inlet passages to the air pressure source.

4. A frame having a handle and a pair of support arms for supporting one of a number of cutting and trimming devices,
a piston and cylinder assembly mounted on or in said frame,
said piston and cylinder assembly including a piston operatively connected to one of the operating devices and a cylinder having an inlet passage and a discharge passage at each end,
a pressure responsive control valve assembly mounted on each end of said cylinder for controlling the flow of air through said passages,
said valve assembly including a valve member which is responsive to inlet air pressure to close the discharge passage and to discharge pressure to close said inlet passage, and
a trigger operated air control valve assembly for selectively pressurizing one of said air inlet passages to move said piston in one direction, and the other air inlet passage when moved in the other direction.

5. A universal head for a number of cutting and trimming devices, said head comprising:
a frame for supporting the trimming devices
a piston and cylinder assembly mounted on or in said frame, and being operatively connected to the devices,
a trigger assembly mounted on said frame for selectively pressurizing said piston and cylinder assembly to actuate the devices, and
means at each end of said piston and cylinder assembly for controlling flow of air into and out of said piston and cylinder assembly, said means including a bore at each end of said piston and cylinder assembly and a valve assembly mounted in each bore.

6. A universal head for actuating one of an umber of cutting and trimming assemblies, said head comprising:
a handle,
a double acting piston and cylinder assembly secured to said handle,
a bore at each end of said piston and cylinder assembly, an inlet passage and an outlet passage at each end of each of said bores for connecting said bore to said piston and cylinder assembly, a valve member in each bore and a spring in each bore for biasing said valve member to a closed position with respect to the corresponding inlet passage,
a passage in aid handle, and
means in said handle for selectively connecting said passage to one or the other of said bores at each end of said piston and cylinder assembly,
said valve members responding to pressure in said bore to pen said inlet passage and close said outlet passage.

7. The head according to claim 6 wherein said moving means comprises a tubular member mounted in said passage in said handle and a valve stem in said tubular member.

* * * * *